United States Patent [19]
Lindgren et al.

[11] 3,922,434
[45] Nov. 25, 1975

[54] METHOD OF PRODUCING A TEMPORARILY PRODUCT AND PRODUCTS PRODUCED ACCORDING TO SAID METHOD

[76] Inventors: John Ivar Lindgren, Alvvagen 10, Sorberge; Per Edward Carl Udden, Hogbo, Vivsta, Timra; Bengt Axel Wennerblow, Storgatan 15, Sundsvall, all of Sweden

[22] Filed: June 22, 1973

[21] Appl. No.: 372,503

Related U.S. Application Data

[63] Continuation of Ser. No. 876,200, Dec. 1, 1969, abandoned, Continuation of Ser. No. 643,416, June 5, 1967, abandoned.

[30] Foreign Application Priority Data

June 17, 1966 Sweden ............................. 8317/66

[52] U.S. Cl. ................ 428/342; 128/287; 128/290; 427/194; 427/361; 427/369; 428/535
[51] Int. Cl.² ........................................ D21H 1/42
[58] Field of Search ............ 128/287, 290; 117/157, 117/166

[56] References Cited
UNITED STATES PATENTS

| | | | |
|---|---|---|---|
| 3,078,849 | 2/1963 | Morse | 128/290 |
| 3,123,075 | 3/1964 | Stamberger | 128/287 |
| 3,202,539 | 3/1965 | Holt et al. | 117/16 |

OTHER PUBLICATIONS

Paper Coating Additives, Methyl Cellulose as a Modifier of Coating Colors, pp. 142, 143, 148, 149, 150.

*Primary Examiner*—Michael R. Lusignan
*Attorney, Agent, or Firm*—Stevens, Davis, Miller & Mosher

[57] ABSTRACT

This invention relates to a process of adding a water soluble polymer powder of a viscosity of at least 50 centipoises at 20°C in a 2% aqueous solution to a fibrous substrate capable of disintegration in water upon prolonged contact to form a hygienic paper product. This invention also relates to a temporarily waterproof paper article comprising a fibrous substrate capable of disintegration in water and a covering particulate layer produced from a powder of a water-soluble polymer of a viscosity of at least 50 centipoises at 20°C in a 2% aqueous solution.

4 Claims, No Drawings

METHOD OF PRODUCING A TEMPORARILY PRODUCT AND PRODUCTS PRODUCED ACCORDING TO SAID METHOD

This is a continuation of application Ser. No. 876,200, filed Dec. 1, 1969, and now abandoned, which is a continuation of Ser. No. 643,416, filed June 5, 1967 and now abandoned.

The co-pending U.S. patent application Ser. No. 448,800, filed Apr. 16, 1965, and now abandoned, discloses a method of producing products which are temporarily impervious to water but which yet are capable of breaking up in water. Said method involves combining at least two substances with each other to form two or more layers, said substances being capable of dissolving and, respectively, breaking up in water. The combination in question comprises at least one layer capable of dissolving in water, said layer preferentially consisting of a polymer foil, and at least one layer, capable of breaking up in water and preferably consisting of a paper. A combination of the kind mentioned is temporarily waterproof, in case water is supplied to the polymer foil side of the product.

The present invention is a development of the afore-described method for producing products that are, at least temporarily, waterproof. As distinguished from what is the case in the aforementioned co-pending application, Ser. No. 448,800, the present invention, however, is not restricted to products capable of breaking up in water. As a matter of fact a particular object of the invention is to provide for products which need not be capable of readily disintegrating but which present a temporary water-proofness in combination with a high perviousness to water vapor and, in certain cases, perviousness also to air and gas.

In the co-pending application, Ser. No. 448,800 the layer, capable of dissolving in water, is described as consisting, preferentially, of a polymer foil. However, such a foil is too expensive for a great many purposes. Surprisingly, it has proved possible to obtain just as good a water-proofing effect when using the water-soluble polymer in particle form. At the same time good perviousness to air and gas and also an increased perviousness to water vapor is thereby obtained. However, the latter is high already in products in which the polymer is in foil form.

The method according to the present invention is characterized by combining a water-permeable carrier with a water-soluble polymer in particle form.

The carrier consists substantially of such materials as cloth, paper, sponge, foamed plastic and the like. In case it is desired to obtain a product, capable of desintegrating in water, the carrier material preferentially should consist of an unsized paper of low wet strength.

The carrier material need not necessarily be plane. For example, it may be suitable that the material be subjected to compression moulding prior to, simultaneously with, or subsequently to having been combined with the water-soluble polymer.

As a water-soluble polymer it is possible to use, for instance, natural products, such as substances of the protein or carbohydrate type. Examples of such substances are gelatin, casein, gums of various kinds, water-soluble starch and alginates. Semi-synthetic substances, such as derivatives of the abovementioned products may also be contemplated. Particularly suitable are water-soluble cellulose derivatives such as methylcellulose, hydroxyethylcellulose, ethylhydroxyethyl-cellulose and carboxymethylcellulose, the latter in the salt form. Also, several all-synthetic polymers are suitable, such as polyvinyl alcohol, polyethylene oxide, polyvinylpyrrolidone, and salts of polyacrylic acid.

It is not necessary that the polymer, when combined with the carrier material, be in a finally polymerized state. It may be added as a monomer or as a prepolymerizate and be polymerized in situ.

Preferably the polymer may be so high-molecular that it will give a high viscosity in an aqueous solution, in which case the risk of rapid soaking is reduced. Preferably the polymer in a two percent aqueous solution should have a viscosity of at least 50 cp. (centipoises) at 20°C, measured with a Brookfield viscosimeter at 50 r.p.m. In certain cases it is, however, possible to use more low-molecular polymers, viz. by combining them with a gelling agent. Most of the polyvinyl alcohol qualities, obtainable in the open market, give a low viscosity in water. However, by combining them with borax very high viscosities can be obtained. Other examples of combinations of polymer gelling agents are sodium-carboxymethylcellulose-aluminum-ions and sodium-alginate-calcium-ions.

There are several possibilities of combining the carrier material and the water-soluble polymer in particle form.

One possibility consists in suspending the polymer particles in a liquid, in which the polymer material is insoluble, after which said suspension is applied to the surface of the carrier material and the liquid is caused to evaporate. In the present connection this way of application is termed "coating", because there are fundamental similarities to the applying, to paper, of pigment in an aqueous suspension.

In connection with such coating it is of advantage, if the polymer particles are small, in order to obtain a homogeneous suspension which is capable of being readily applied. Furthermore it is desirable that the liquid phase be thickened by means of a moderate addition of a polymer, soluble in the liquid, in order that the polymer particles shall not settle too readily. Such an addition also may have the function of preventing the liquid phase from penetrating into the carrier material too quickly in connection with the coating operation and also the function of binding the polymer particles to each other and to the carrier subsequently to the liquid phase having evaporated after the coating operation. Another way of improving the homogeneity of the suspension and of increasing the binding effect in the layer of polymer material, and between polymer and carrier, consists in adding so much water to the suspension that the polymer will swell but still does not dissolve.

If it is sufficient that the final product should be temporarily tight with respect to cold water it is possible, in connection with the coating, to use warm water as a non-solvent by choosing a polymer which is soluble in cold water but insoluble in warm water. Examples of such polymers are methyl-cellulose and ethylhydroxyethylcellulose, which are entirely insoluble in water having a temperature of 80°C but which are altogether soluble in water of a temperature up to 50°C.

EXAMPLE 1.

A suspension of sodiumcarboxymethylcellulose in ethanol was prepared in the following manner:

In ethanol, having a concentration of 93 percent by weight, hydroxypropylcellulose (Hercules Klucel M) was dissolved to the concentration of 1%. To 75 parts by weight of ethanol, thus thickened, were added, while stirring, 25 parts by weight of pulverulent sodiumcarboxymethylcellulose (Na-CMC), screened through a DIN 325-filter. The product had a degree of substitution (DS) of 0.77 and presented a viscosity of 3080 cp. in a 2 % water solution, measured with a Brookfield viscosimeter at 50 r.p.m. and 20°C. The 25 % Na-CMC-suspension in ethanol had a viscosity of 1050 cp. measured with a Brookfield viscosimeter at 50 r.p.m. and 20°C.

The coating, with the Na-CMC-suspension, on paper was carried out with a so-called doctor blade, a method well known in connection with conventional coating of paper. According to said method a surplus of coating paste is applied to paper, which is then scraped off by means of a thin blade. In the experiment in question there was used a laboratory apparatus, which made it possible to coat sheets. The paper used was an unsized filter paper having a basis weight of 80 g/m$^2$. The amount of applied coating paste was about 40 g/m$^2$, equalling to about 10 g/m$^2$ of Na—CMC. After the coating the papers were dried at room temperature. In order to test the coated papers in respect of their waterproofness, cut-out circular samples were folded so as to form the insertion of a funnel. Water was poured into said insertion. It was established that no water dripped through the insertion, not even after several hours.

The papers were tested also in respect of their capability of breaking up in water and they proved capable of breaking up just as readily as the uncoated filter paper.

EXAMPLE 2.

A methylcellulose (Methocel, The Dow Chemical Co.) was ground and screened through a DIN 50-filter. 10 parts by weight of this powder were suspended in 90 parts by weight of water, the temperature of which was 95°C and wherein had been dissolved, as a thickening agent, 1 percent by weight of high viscous Na—CMC. The paste-like substance thus obtained was spread on a filter paper by means of a scraper having a slot width of 0.6 mm. In this way the amount of applied coating paste was about 50 g/m$^2$, equalling to about 5 g/m$^2$ of methylcellulose. The papers, thus treated, possessed good waterproofness and capability of breaking up in water.

A second possibility of combining a carrier material and polymer in particle form consists in the direct application of dry polymer to the carrier. This way of application is here called "dusting".

The dusting may be carried out as a simple application of finely distributed polymer to the surface of the carrier. In case the carrier is of a porous nature a certain amount of polymer powder will then get stuck purely mechanically. Any surplus of powder may, for instance, be brushed away.

In connection with an application to the surface of the kind mentioned, it may be of advantage that the carrier be a little moist, in which case the binding to the polymer layer is improved.

A deeper distribution of the polymer particles in the carrier may, for example, be obtained by sucking, pressing or vibrating the powder into the carrier.

The above described dusting methods no doubt are simple but there are certain drawbacks. On one hand it is difficult to obtain a uniform covering layer and, on the other hand, dusting problems readily occur. This can be avoided by using an electrostatic covering method. In that case, for instance, the carrier is moved continuously over an earthed roller, while negatively loaded polymer powder is being blown against the paper.

EXAMPLE 3.

A web of crepe paper, so-called tissue paper, having a basis weight of about 20 g/m$^2$, was moved through a vat filled with finely ground Na—CMC of the quality SCA (Svenska Cellulosa Aktiebolaget) Cellufix 3000 spec. Then about 7.5 g. of powder, per m$^2$ and side, of the paper, got stuck to the paper. In order that there should not be too much dust from the paper in connection with the continued handling thereof the least adhering CMC-powder was removed by slight vibrations. There was left about 4 g of CMC-powder, per m$^2$ and side, of the paper.

For reasons, readily understood, a paper covered in this way is not particularly waterproof as far as one layer is concerned. If, however, three such layers are placed on each other it will be found that this combination of layers does not allow water to penetrate therethrough for many hours.

EXAMPLE 4.

A filter paper, having a basis weight of 80 g/m$^2$, was moistened on its one side by means of a water solution containing 10 percent by weight of glycerol, as a softener, and 0.5 percent by weight of high viscous NA-CMC as a thickening agent. The applied amount of solution was about 50 g/m$^2$. On the wet paper surface finely ground CMC-powder was sprinkled in an amount of 25 g/m$^2$. As a mechanical protection against a subsequent dusting-off a tissue paper, having a basis weight of 20 g/m$^2$, was pressed against the moist CMC-layer, after which said combination of materials was dried.

The material, prepared in the above described manner, proved waterproof for several hours. After ½ hour certain bleedings could occur. The material is capable of readily breaking up in water and it is suitable, for instance, for insertions in bed-pans.

A third possibility of combining the carrier material with a polymer in particle form consists in adding the polymer in connection with the manufacture of the carrier or in partially transforming the carrier material into a water-soluble polymer by chemical transformation. In the present connection this is termed "simultaneous manufacture".

One way of adding the polymer in connection with the manufacture of the carrier consists in, for example, mixing cellulose powder and pulverulent water-soluble polymer, adding a small amount of water and then compression molding the mixture.

As an example of one way, according to which the carrier is, in part, transferred into a water-soluble polymer by chemical transformation we may mention the carboxymethylating of the surfaces of such cellulosic materials as paper and cloth.

The above described three possibilities of bringing together the carrier material and the polymer may be combined both with each other and with other methods, for instance, the methods described in the previously mentioned co-pending application, Ser. No. 448,800, for building up the temporarily waterproof material. Thus, for example, a paper may first be dusted with polymer powder and then be surface coated with a polymer solution in water, by which it is obtained that, in connection with the surface coating operation, the polymer will remain in the surface layer of the paper and form a more coherent foil than if the paper had not been dusted.

In several of the described methods of combining the carrier material with the polymer in particle form a denser product can be obtained by adding to the product limited amounts of water, preferably together with a softener, so that the polymer will swell, after which the product is again dried. Another way of making the product denser consists in compressing it. An example of a way of doing this is the calendering of paper, which is surface-coated with powder.

As will have been seen from the examples the most important embodiment of the invention consists in paper provided with a surface layer of a water-soluble polymer. In some connections it has proved advantageous to combine a plurality of such papers. This has turned out to be particularly valuable in applying the invention to such products as diapers and sanitary napkins, for if a combination of a plurality of thin papers, covered with polymer layers, is compared with a single paper covered with a corresponding amount of polymer in a single layer, then it is found that the firstmentioned product does not only become softer, which often is of advantage, but also becomes tighter with respect to water.

The water-proofness of products according to the invention may be varied within wide limits, for instance, by varying the amount of polymer or the capillary diameter of the pores of the carrier.

The practically never-ending durability of waterproofness obtained with such materials as a polythene foil and the like is not possible, nor intended, to obtain by the present invention.

When measuring the water-proofness, partly the time of the first spot bleeding and, partly, the amount of penetrated water after 1 hour were annotated. It then proved that a polymer amount of about 20 g/m$^2$ causes the first spot bleeding after about 30 minutes and water penetration after about 1 hour when using a polymer amount of about 50 g/m$^2$. A considerable part of this amount of water consists of water vapor, which has diffused through the material.

The permeability of products, obtained in accordance with the invention, may be very high in those cases when the polymer never has been allowed to swell. When swelling of the polymer has been included as a step in the process of manufacture of the product a coherent polymer film may form in extreme cases, and then the permeability becomes low to most gases but not to water vapor.

The capability of breaking up, in water, of products obtained in accordance with the invention in the first place depends on the carrier material. A condition of a good capability of breaking up is that the wet strength of the carrier material is low. Preferentially unsized or slightly sized papers are to be used as carrier materials.

As mentioned above it may, sometimes, be of advantage to combine several thin layers of polymer-coated or polymer-mixed paper with each other. Fundamentally this leads to a product capable of breaking up with relative difficulty, because the penetration of water into the interior layers of the product has been rendered more difficult. However, it is possible to adapt the water retarding capacity of the individual layers, so that the water will, relatively quickly, at least penetrate to the middle layer. Moreover, suction takes place from the edges of the material. In connection with such suction deformation of the paper often takes place, so that passages are formed which further facilitate the penetration of water.

Although, as already mentioned, the duration of the water-proofness is limited, it is fully sufficient for many purposes. Thanks to the unique combination of properties of a temporary waterproofness with a certain amount of permeability to gas and, in case a suitable carrier is selected, also with the capability of breaking up in water, products obtained in connection with the present invention can be used within several given fields of application.

As examples of fields of application, in which the water-proofness and the gas permeability of the product are utilized, but in which the capability of breaking up in water is less important, first-aid supplies may here be mentioned.

As examples of fields of application, in which the combination of waterproofness and capability of breaking up in water is utilized, insertions in bed-pans, toilet paper and wash cloths, may be mentioned.

All of the three properties mentioned, i.e. waterproofness, permeability to gas and capability of breaking up in water, can be used in such products as sanitary napkins and diapers. In these applications a certain permeability to gases, particularly water vapor, may be desirable so as to give the skin the opportunity of a normal exchange of gas with the surrounding atmosphere.

What we claim is:

1. A process for making a hygenic paper product temporarily waterproof and permeable to water vapors and which will disintegrate upon prolonged contact with water which comprises adding a powder to a low wet strength paper carrier sheet material of a fiber capable of disintegration in water upon prolonged contact, said powder being added to form in a final product a particulate layer of at least 10 g/m$^2$ on said carrier and said powder consisting essentially of a water soluble polymer which has a viscosity in a 2 % aqueous solution of at least 50 centipoises at 20°C measured with a Brookfield viscosimeter at 50 r.p.m. and selected from the group consisting of methylcellulose, ethylhydroxyethylcellulose and the sodium salt of carboxymethylcellulose.

2. The process of claim 1, wherein dry particles of said polymer are distributed over the surface of the carrier and sucked, pressed or vibrated into the carrier.

3. The process of claim 1, wherein said carrier is an unsized or slightly sized paper capable of breaking up in water.

4. A hygenic paper product temporarily waterproof and permeable to water vapors and which will disintegrate upon prolonged contact with water comprising a. a carrier sheet made of a fiber capable of disintegration in water upon prolonged contact and is a low wet strength paper; and b. a particulate covering layer produced from a powder of a water-soluble polymer in an amount of at least 10 g/m$^2$ on said carrier sheet, said polymer having a viscosity in a 2 % aqueous solution of at least 50 centipoises at 20°C measured with a Brookfield viscosimeter at 50 r.p.m. and selected from the group consisting of methylcellulose, ethylhydroxyethylcellulose and the sodium salt of carboxymethylcellulose.

* * * * *